United States Patent [19]

Leiseca et al.

[11] Patent Number: 5,253,165

[45] Date of Patent: Oct. 12, 1993

[54] COMPUTERIZED RESERVATIONS AND SCHEDULING SYSTEM

[76] Inventors: Eduardo Leiseca, 5132 SW. 127th Ct., Miami, Fla. 33175; Ramon F. Aguero, 1125 Coral Way, Coral Gables, Fla. 33134

[21] Appl. No.: 625,993

[22] Filed: Dec. 12, 1990

Related U.S. Application Data

[63] Continuation-in-part of Ser. No. 449,057, Dec. 18, 1989, abandoned.

[51] Int. Cl.$^5$ .............................................. G06F 15/24
[52] U.S. Cl. ..................................................... 364/407
[58] Field of Search .......................................... 364/407

[56] References Cited

U.S. PATENT DOCUMENTS 4,775,936 10/1988 Jung ..................................... 364/407
4,862,357 8/1989 Ahlstrom et al. .................... 364/407
4,931,932 6/1990 Dalnekoff et al. ................... 364/407

OTHER PUBLICATIONS

Donoghue, J., "Reservations systems likely to be disciplined", *Air Transport World*, Sep. 1983, pp. 24–30.
Feldman, J. "US inconsistencies cloud international code-sharing", *Air Transport World*, Apr. 1988, pp. 20–25, 91.
Moorman, R., "Executive Air Charter soars in the Caribbean", *Air Transport World*, May 1988, pp. 82–84, 89.
Henderson, D., "Getting information, not just data", *Air Transport World*, Aug. 1989, pp. 54–57, 62, 63.
Gifford, D. et al., "The TWA Reservation System", *Communications of the ACM*, vol. 27, No. 7, Jul. 1984, pp. 650–665.

*Primary Examiner*—Stephen M. Baker
*Attorney, Agent, or Firm*—Longacre & White

[57] ABSTRACT

A computerized reservations and scheduling system is provided which alternately allows transportation consumers to select from pre-scheduled transportation services provided by transportation providers or to negotiate and contract with transportation providers who have available unscheduled transportation space. The system comprises a central computerized data base. Transportation providers and consumers alike access the computer via a plurality of terminal units. The central computerized data base comprises a "maybe" file for storing information regarding available unscheduled transportation space which may be offered by a provider for service if a suitable consumer demand exists and for storing information regarding unscheduled transportation space which is needed by consumers. The "maybe" file facilitates negotiating and contracting between the parties.

1 Claim, 2 Drawing Sheets

COMPUTERIZED RESERVATIONS AND SCHEDULING SYSTEM

CROSS REFERENCE TO RELATED APPLICATION

This application is a continuation-in-part of U.S. Ser. No. 07/449,057 filed on Dec. 18, 1989, now abandoned.

BACKGROUND OF THE INVENTION

The present invention pertains to the field of computerized systems which enter and track reservations made by consumers for scheduled passenger or cargo space provided by commercial carriers. More specifically, the present invention pertains to the field of such computerized systems wherein means are provided for allowing consumers and providers (e.g. the commercial carriers) to negotiate and contract for unscheduled passenger or cargo space when special circumstances give rise to an occasion for which the use of scheduled passenger or cargo space is unsuitable.

Various computerized reservations systems have been proposed for tracking reservations made by consumers for scheduled passenger or cargo space provided by commercial carriers. While many of these systems allow consumers to contract for and confirm reservations for such scheduled space, these systems necessarily offer services which are limited by the terms and conditions specified unilaterally by the provider at the scheduling of such passenger or cargo space. Since the scheduling of the passenger or cargo space is conventionally undertaken by the provider before any reservations are made and with little or no knowledge of the special circumstances faced by a consumer, if because of his special circumstances the consumer needs special terms and conditions which are not provided for in the scheduled passenger or cargo space, the provider is unable to adapt his services to meet the consumer's special needs. Thus, in each of the present computerized reservations systems, the providers must undertake the scheduling of passenger or cargo space without knowledge of special (i.e. not foreseeable or predictable) circumstances which a consumer may be faced with, and the consumers must select from scheduled passenger or cargo space having terms and conditions which may not meet their special needs. In this respect, the present computerized reservation systems do not optimize transaction efficiency between the providers and the consumers.

SUMMARY OF THE INVENTION

It object of the present invention to provide a computerized reservations and scheduling system wherein the transaction efficiency between providers and consumers of passenger or cargo space can be maximized. This is accomplished by notifying providers of special circumstances faced by consumers for which no scheduled space is suitable. With this information, providers can determine whether it is economically efficient to adapt their services to meet the needs of these consumers.

It is a further object of the invention to provide a computerized reservations and scheduling system wherein consumers of passenger or cargo space who face special circumstances for which no scheduled space is suitable can optionally initiate negotiations and contract with providers of the passenger or cargo space through services provided by the computerized reservations and scheduling system.

Specifically, the invention comprises a computerized reservations and scheduling system adapted to be used by transportation space providers and consumers, comprising: a computerized data base; a plurality of terminal units each comprising a display means for displaying information outputted from the computerized data base and an input means for inputting data to the computerized data base; the computerized data base being programmed to selectively output a plurality of display screens to each of the display means, the plurality of display screens comprising information detailing scheduled transportation space offered by the transportation space providers, rates associated with the scheduled transportation space, unscheduled transportation space needed by the transportation space consumers, and available unscheduled transportation space offered by the transportation space providers; wherein the computerized data base further comprises: means for allowing the transportation space consumers to contract with the transportation space providers, through the computerized data base, in order to reserve the scheduled transportation space, and means for allowing the transportation space consumers who need unscheduled transportation space to negotiate and contract, through the computerized data base, with the transportation space providers who offer available unscheduled transportation space.

According to the invention, the computerized data base further comprises "maybe" file means for the storing the information detailing the unscheduled transportation space needed by the transportation space consumerse and for storing the information detailing the available unscheduled transportation space offered by the transportation providers, and wherein means are provided for permitting the transportation space providers and consumers to gain access to and view the information stored in the "maybe" file means. Moreover, means are provided in the computerized data base for permitting the transportation space consumers who are seeking unscheduled transportation space to negotiate and contract with the transportation space providers who have available unscheduled transportation space detailed in the information stored in the "maybe" file means.

These and other aspects of the present invention will become apparent after a review of the following specification and accompanying drawings in which:

DESCRIPTION OF THE PREFERRED EMBODIMENT

Figure 1:
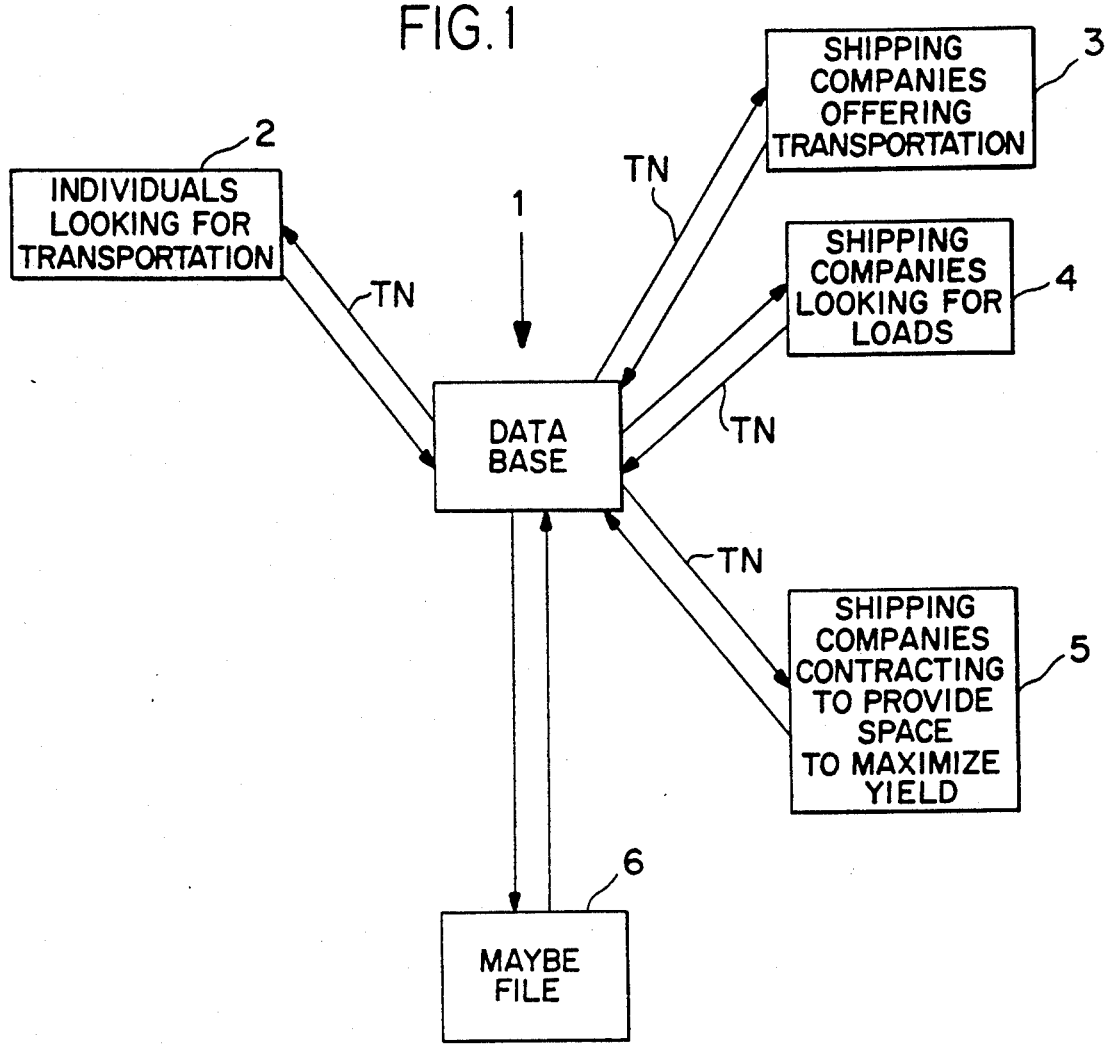
FIG. 1 is a block diagram representing the computerized reservations and scheduling system according to the present invention.

According to the present invention, a computerized reservations and scheduling system is shown in FIG. 1. The heart of the system is a computerized data base 1. The data base 1 is linked via telecommunications network TN with a plurality of system users 2, 3, 4, 5. In the block diagram shown in FIG. 1, the system users 2 represent individuals (e.g. consumers) looking for passenger or cargo transportation space. Similarly, the system users 3 represent shipping companies (e.g. providers) offering passenger or cargo transportation space. The system users 4 represent shipping companies (e.g. providers) looking for passenger or cargo loads. Finally, the system users 5 represent shipping companies (e.g. providers) contracting to provide passenger or cargo transportation space to maximize capital yield (e.g. efficiency). The system users 2 may use the data base 1 so reserve previously scheduled transportation space, as in a conventional reservations system. Alternately, the system users 2, 3, 4, or 5 may negotiate and contract together for unscheduled transportation space by using a "maybe" file 6 (which is part of the data base 1), as will be described hereinafter.

Figure 1A:
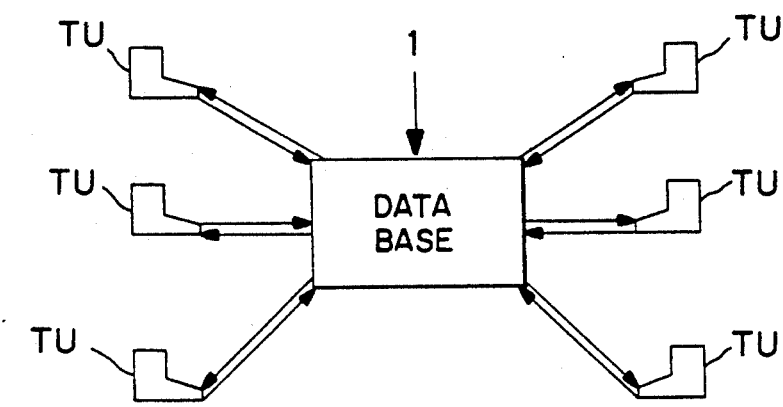
FIG. 1a reveals the hardware employed in the system of FIG. 1.

The hardware which comprises the computerized reservations and scheduling system is shown in FIG. 1a. A plurality of terminal units TU are connected to the data base via the telecommunications network and are adapted to be used by system users for accessing the data base. Each of the terminal units typically comprise a CRT (for displaying information) and a keyboard (for entering data). Although six terminal units have been shown in FIG. 1a, it is to be understood that any number of terminal units could be employed in the present system.

According to the invention, the computerized data base 1 is programmed to send display information to each of the CRTs in the form of user information screens. Moreover, the computerized data base 1 is programmed to receive and respond to data information entered by system users on each of the keyboards. In this manner, system users at each terminal unit TU are able to access and/or enter reservations and/or scheduling information while taking full advantage of the features and safeguards of the present invention.

The user information screens displayed on each of the terminal units by the computerized data base will now be described.

Available Passenger or Cargo Transportation Space and Rates/Tariffs Screen: In this screen, available scheduled transportation space is displayed. For each entry in this screen, the information includes the name of provider, date(s) of travel, origination, destination, departure and arrival times, intermediate stops, rates/tariffs, terms, and conditions, if any. Transportation providers may, through a data entry sequence on the keyboard, enter information regarding their scheduled trips into the data base and thus have their scheduled transportation space included on this screen. Of course, it will be understood that once a provider enters a listing into one of the available transportation space screens, all pertinent information about the provider, including his address, will be stored in the computerized data base.

"Maybe" Passenger or Cargo Transportation Space Available Screen: In this screen, transportation providers provide a description of transportation space which may be available for consumers. To make an entry on this screen, the transportation provider determines and enters on the keyboard restrictions or limitations (if any) regarding the available date(s) of travel, origination, destination, times of arrival and departure, intermediate stops, rates/tarries, terms, and conditions that he is willing to offer. Thus, the "maybe" space available screen lists all such transportation space entered by providers which is not "scheduled" per se, but which may be available to a consumer who is agreeable to the restrictions placed on the space by the provider.

"Maybe" Passenger or Cargo Transportation Space Needs Screen: In this screen, transportation consumers provide a description of transportation space which is needed by the consumers. To make an entry on this screen, the transportation consumer determines and enters on the keyboard restrictions or limitations (if any) regarding the needed date(s) of travel, origination, destination, times of arrival and departure, intermediate stops, rates/tarries, terms, and conditions that he is willing to accept. Thus, the "maybe" space needed screen lists all such transportation space entered by consumers which is not "scheduled" per se, but which is needed by a consumer and which may be provided by a provider who is agreeable to the restrictions placed on the space by the consumer.

Negotiation Screen: In this screen, providers and consumers who have listed or contemplate listing similar, though not identical, restrictions on their available and needed "maybe" transportation spaces, respectively, may attempt to negotiate final restrictions on such transportation spaces which are acceptable to both parties, thereby maximizing capital efficiency. The negotiating is carried out via "electronic mail" capabilities programmed into the computerized data base. Specifically, if a consumer becomes aware (in a manner which will be described hereinafter) that a provider is offering "maybe" transportation space with restrictions similar to what the consumer is looking for, then the consumer will utilize "electronic mail" to send a message (e.g. entered on the keyboard) to the provider. The message may, for example, be in the form of an offer of compromise regarding the restrictions which were not initially agreeable to both parties. After initial contact has been established, negotiations may proceed via electronic mail until a settlement is reached or until negotiations are aborted. On the other hand, if a provider becomes aware that a consumer needs "maybe" space with restrictions similar to what the provider is willing to offer, the provider may initiate contact with the consumer, via electronic mail, to attempt to negotiate finalized restrictions. Of course, it will be understood that once a provider or consumer enters a listing into one of the "maybe" transportation space screens, all pertinent information about the party, including his name and address, will be stored in the computerized data base. Moreover, at his request, the provider or consumer may have the contents his electronic mail outputted by the computerized data base and delivered to him (or otherwise made known to him) by conventional means. It will also be understood that the negotiating screen may comprise "canned" documents which each of the parties are required to fill in order to effect negotiating.

Contract Screen: In this screen, parties who can match their available or needed transportation space with needed or available transportation space (respectively) that has already been stored in the computerized data base (either in a scheduled file or a "maybe" file) by other parties may contract together, via electronic mail, thereby finalizing an agreement regarding present and/or future actions of the parties. Alternately, parties who have negotiated "maybe" space on the screen described above may also contract together on this screen once negotiations have been successfully completed. It will be understood that the contract screen may comprise "canned" documents which both of the parties are required to fill in (e.g. portions of) in order to effect contractual obligations. According to the invention, once contracting between a provider and a consumer has been concluded (e.g. completely negotiated and agreed to), the computerized data base immediately outputs copies of the contract (e.g. via electronic mail, via print out, etc.) to be delivered (or otherwise made known to) to each of the parties to the contract.

Various other display screens may be provided for facilitating transactions between the system users. For example, a location screen may be provided to allow governmental or law enforcement agencies to track the updated location of each transportation vessel which books its passengers or cargo through the computerized reservations and scheduling system. Cancellation screens may be provider to allow system users to contact, e.g. via electronic mail, parties they have contracted with when it becomes necessary to cancel previously arranged contracts. Moreover, help screens may be provided to aid users who are unfamiliar with the system. Finally, weather and news screens may be provided to, containing information which affects the operations of system users, may also be provided.

Figure 2:
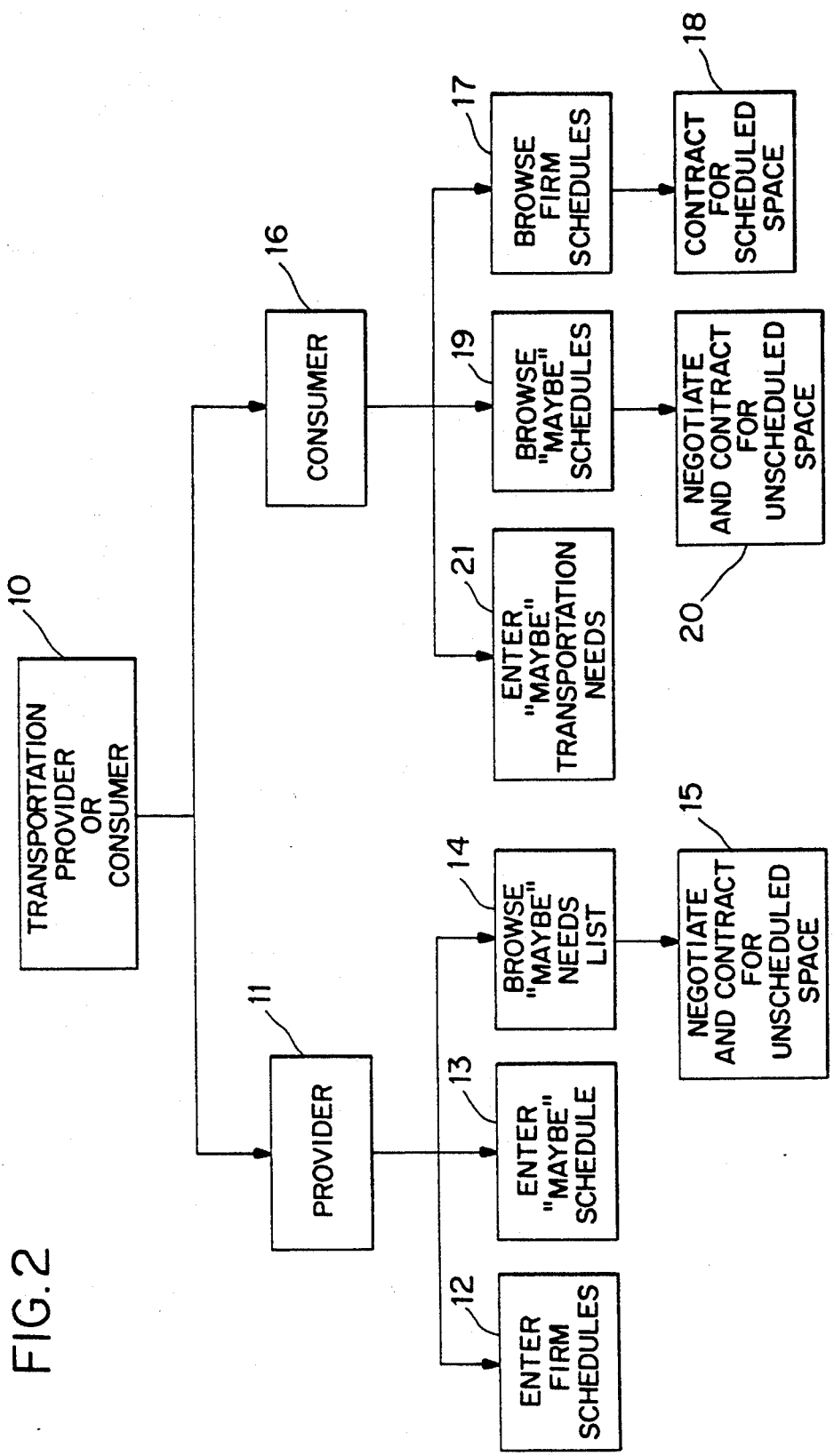
FIG. 2 reveals a flow diagram of the reservations and scheduling techniques employed in the system of FIG. 1.

The operation of the computerized reservations and scheduling system is as follows:

Each terminal unit TU may service both transportation providers and transportation consumers. As shown in FIG. 2, the computerized data base is programmed to interrogatively lead a terminal unit user through a series of system steps. In a first step 10, the system interrogates the user (e.g. via a question on a display screen) as to whether he is a transportation provider or consumer. The user enters the appropriate response on the keyboard.

If the user is a transportation provider, the system proceeds to step 11. From step 11, the transportation provider is given three options (e.g. detailed on a display screen). If he desires to enter firm (e.g. non-negotiable) schedules of transportation into the data base, he chooses to proceed to step 12. At this step, the computerized data base prompts the provider to enter the scheduling information which he desires to have displayed on the Available Passenger or Cargo Transportation Space and Rates/Tarries Screen, as well as other information needed by the data base. The information entered by the provider is then stored in the data base, and the Available Passenger or Cargo Transportation Space and Rates/Tarries Screen is updated to reflect the new stored information.

If the provider desires to enter a "maybe" schedule (e.g. negotiable available transportation space) into the data base, he chooses to proceed to step 13. At this step, the computerized data base prompts the provider to enter the information (e.g. restrictions) which he desires to have displayed on the Maybe Passenger or Cargo Transportation Space Available Screen, as well as other information needed by the data base. The information entered by the provider is then stored in the data base, and the Maybe Passenger or Cargo Transportation Space Available Screen information stored in the data base is updated to reflect the new stored information.

Alternately, if the provider desires to browse through a list of "maybe" passenger or cargo transportation space needs already entered into the data base by various consumers, he chooses to proceed to step 14. At this step, the computerized data base outputs to the Maybe Passenger or Cargo Transportation Space Needed Screen to the provider's terminal unit. The provider may prompt the system, through keyboard data entry, to limit the particular listings displayed on the screen to only certain ones of the "maybe" transportation needs listings stored in the data base. For example, the provider may request a display of only those "maybe" transportation needs arising at a particular location (e.g. origination) on a particular date. After viewing this screen, the provider may, at his option, enter step 15 or step 13.

In step 15, the provider may employ the negotiation screen and/or the contract screen to negotiate and/or contract with a consumer who has transportation needs for which the provider may have available transportation space. In this step, wealth increasing contracts are formalized and transportation space needs are effectively matched with available transportation space. Confirmation of these contracts is given to the parties immediately. Moreover, in this step, safeguards such as passwords, codes, etc. may be employed to lessen the possibility of unauthorized contracts. Step 15 is entered by a provider when he has found an exact match between services he is willing to offer and "maybe" transportation needs of a consumer or when he has found a close match therebetween which he believes, through further negotiations, could lead to a contract.

If at step 10, the user indicates that he is a transportation consumer, then the system proceeds to step 16. From step 16, the transportation consumer is given three options (e.g. detailed on a display screen). If he desires to browse firm (e.g. non-negotiable) schedules of transportation in the data base, he chooses to proceed to step 17. At this step, the computerized data base displays the Available Passenger or Cargo Transportation Space and Rates/Tarries Screen. The consumer may prompt the system, through keyboard data entry, to limit the particular listings displayed on the screen to only certain ones of the available transportation space listings stored in the data base. For example, the consumer may request a display of only available transportation originating at a particular location (e.g. origination) on a particular date. If the consumer finds suitable transportation space for his needs in the firm schedule listing, then he prompts the system (by an appropriate keyboard entry) to proceed to step 18 wherein the consumer contracts (e.g. using confirmations and safeguards, as described above) for suitable scheduled transportation space offered by the provider.

If, on the other hand, the consumer desires to browse the "maybe" schedules (e.g. negotiable available transportation space), either after the step 16 or after the step 17, then he prompts the system to proceed to step 19. At this step, the computerized data base displays the Maybe Passenger or Cargo Transportation Space Available Screen. The consumer may prompt the system, through keyboard data entry, to limit the particular listings displayed on the screen to only certain ones of the "maybe" available transportation space listings stored in the data base. For example, the consumer may request a display of only "maybe" available transportation originating at a particular location (e.g. origination) on a particular date. If the consumer finds suitable "maybe" available transportation space in this screen for his needs, or if the consumer finds available transportation space in this screen with restrictions that almost match his needs, then he may prompt the computer to enter step 20.

In step 20, the provider may employ the negotiation screen and/or the contract screen to negotiate and/or contract (e.g. using confirmations and safeguards) with a consumer who has transportation needs for which the provider may have available transportation space.

Lastly, if the consumer wishes to enter "maybe" transportation needs into the computerized data base (following either steps 16 or 19) he enters an appropriate response on the keyboard to prompt the system to enter step 21. In this step, the computerized data base prompts the consumer to enter the information (e.g. restrictions) which he desires to have displayed on the Maybe Passenger or Cargo Transportation Space Needed Screen, as well as other information needed by the data base. The information entered by the consumer is then stored in the data base, and the Maybe Passenger or Cargo Transportation Space Needed Screen information stored in the data base is updated to reflect the new stored information. Thus, when a provider thereafter browses this screen, he will become fully aware of the transportation space needed by the consumer.

It will be understood that with the present system, once a contract has been concluded through the computerized data base between a provider and a consumer, the transportation space (e.g. available and/or needed) which has been contracted for will immediately be deleted from the listing(s) in which it originally appeared e.g. either the available scheduled transportation space listing (as displayed in step 17) or the available or needed "maybe" space listings (as displayed in steps 19 and 14). Therefore, system users who browse the transportation space screens in steps 14, 17, and 19 will always be viewing an up-to-the-minute display of the current transportation space situation.

The computerized reservations and scheduling system according to the present invention is particularly suited for use by all the system users 2, 3, 4, 5 described with reference to FIG. 1. With this system, transportation space consumers will have much more flexibility in arranging their shipping schedules. Transportation providers will find it easier to maximize their economic yield by negotiating and contracting to use their space in the most efficient manner. Moreover, transportation providers need not lock themselves into rigid, predetermined schedules to lure consumers business. Rather, depending on the particular transportation needs of consumers, the providers may adapt their "schedules" or trips to fulfill such needs in an economically beneficial (e.g. to both parties) manner.

While the present invention has been described with certain particularity, it is not meant to be limited to the above described embodiment. Many modifications will be obvious to those skilled in the art. Therefore, the present invention will encompass the above described embodiment as well as any modifications which will fall within the scope of the appended claims.

We claim:

1. A method of negotiating and contracting for unscheduled space suitable for a particular need using a computerized data base comprising the steps of:

accessing the computerized data base on a terminal unit connected thereto via telecommunication lines;

browsing, at the terminal unit, a screen of displayed information detailing several entries of scheduled available transportation space which have been stored in the computerized data base;

determining whether scheduled transportation space suitable for the particular need exists based on the information displayed on the scheduled transportation space screen;

entering an appropriate key stroke or key stroke sequence on a keyboard of the terminal unit when suitable transportation space for the particular need is determined not to exist based on the scheduled transportation space screen information, thereby causing the computerized data base to output to the terminal unit a screen of displayed information detailing several entries of available unscheduled transportation space;

browsing, at the terminal unit, the screen detailing the several entries of the available unscheduled transportation space, said available unscheduled transportation space comprising restrictions and conditions;

determining whether available unscheduled transportation space suitable for the particular need exists based on the information displayed on the available unscheduled transportation space screen;

entering an appropriate key stroke or key stroke sequence on the keyboard of the terminal unit when suitable transportation space for the particular need is determined to exist based on the available unscheduled transportation space screen information, thereby causing the computerized data base to output to the terminal unit a contract screen means for facilitating contracting for the suitable transportation space;

contracting for the suitable transportation space through the computerized data base by entering a keystroke or key stroke sequence on the keyboard of the terminal unit to fill in the contract screen means;

entering an appropriate key stroke or key stroke sequence on the keyboard of the terminal unit, when suitable transportation space for the particular need is determined not to exist based on the available unscheduled transportation space screen information, to store consumer needs in said computer data base, said consumer needs comprising restrictions and conditions acceptable to the consumer;

browsing, at the terminal unit, a screen detailing the consumer needs stored in said computer data base;

entering an appropriate key stroke or key stroke sequence on the keyboard of the terminal unit to negotiate the restrictions and conditions of the consumer needs and the available unscheduled transportation space stored in the computer data base; wherein a compromise regarding the restrictions and conditions may be reached resulting in a negotiated transportation space, thereby causing the computerized data base to output to the terminal unit a contract screen for facilitating contracting for the negotiated transportation space;

contracting for the negotiated transportation space through the computerized data base by entering a keystroke or key stroke sequence on the keyboard of the terminal unit to fill in the contract screen means;

wherein, after this step, the computerized data base is programmed to perform the steps of:

outputting and providing each of the parties to the contract with a copy of the contract which has been concluded for the suitable or negotiated transportation space, and updating the information stored in the computerized data base which details the entries of the available unscheduled transportation space so as to delete from this information the entry which comprised the suitable or negotiated transportation space so that, upon the next occurrence of negotiating and contracting for which the computerized data base is employed, when the computerized data base outputs to the terminal unit the screen of information detailing available unscheduled transportation space, the entry which comprised the suitable or negotiated transportation space will not appear.

* * * * *